Dec. 20, 1927.

M. SHOMAN

FIRE HOSE PROTECTOR

Filed June 2, 1927

1,653,127

Inventor
M. Shoman,

By Clarence A. O'Brien
Attorney

Patented Dec. 20, 1927.

1,653,127

UNITED STATES PATENT OFFICE.

MAURICE SHOMAN, OF PLYMOUTH, MASSACHUSETTS.

FIRE-HOSE PROTECTOR.

Application filed June 2, 1927. Serial No. 196,102.

My present invention has to do with the protection of fire hose from vehicular traffic; and it consists in the peculiar and advantageous protector hereinafter described and definitely claimed.

In the accompanying drawings forming part of this specification:—

Similar numerals of reference designate corresponding parts in all the views of the drawings.

Figure 1:
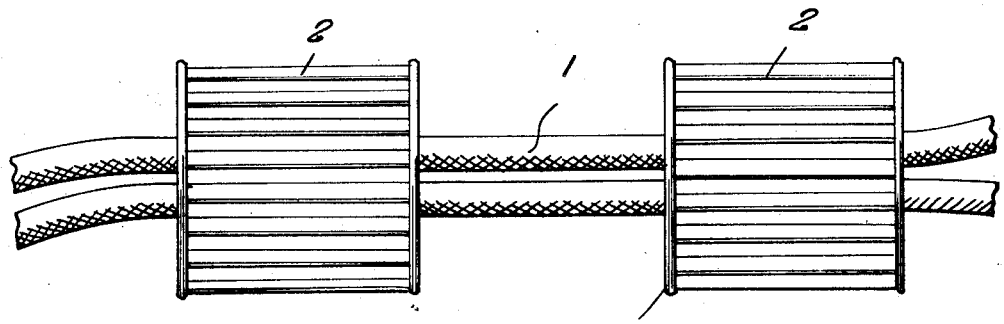
Figure 1 is a plan view showing two lines of hose as extending across a roadway, and two of my novel protectors properly arranged relative to the roadway and lines of hose.

I show in Figure 1 two lines of fire hose 1, and I also show in said figure two of my novel protectors. The said protectors are identical in construction, and therefore a detailed description of the one shown at the right of Figure 1 and in Figures 2 and 3, will suffice to impart a definite understanding of both.

Figure 2:
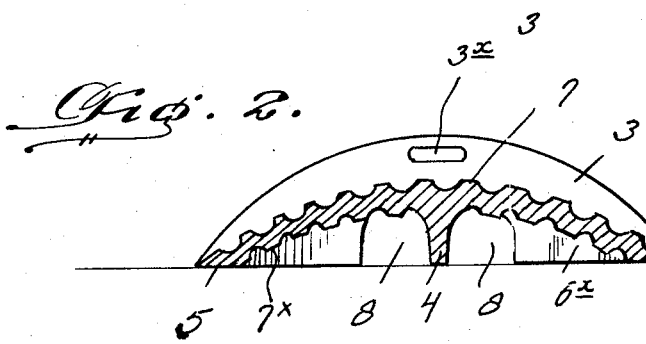
Figure 2 is a vertical longitudinal section of one of the protectors.
Figure 3:
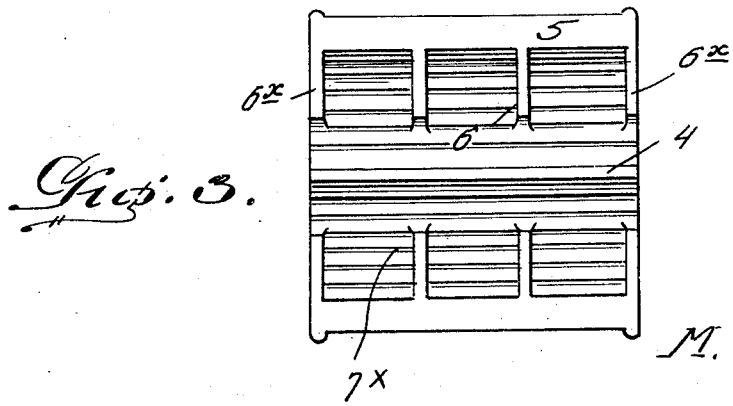
Figure 3 is an inverted plan view of the said protector.

The protector alluded to is formed in one piece of appropiate metal or alloy, by preference, and includes an intermediate portion 2, upstanding flanges 3 at the ends of said intermediate portion and supporting base portions 4, 5 and 6. The base portion 4 is in the form of a pendent rib, Figures 2 and 3, and is designed to rest solidly on a roadway and between lines of hose such as 1. Between the base portions 5 which are designed to rest solidly on the roadway, the intermediate portion 2 of the protector is concavo-convex, and I would also have it understood at this point, that the upper surface of the said intermediate portion 2 is ribbed as designated by 7 in order to afford traction to modern automobile tires. The end supporting portions designated by 6˟ in Figures 2 and 3 are in the form of flanges pendent from the ends of the intermediate portions 2, and it will be understood by comparison of Figures 2 and 3 that the said flange portions 6˟ are provided with alined apertures 8 disposed at opposite sides of the rib 4 and adapted to accomodate lines of hose. As will be understood from Figure 3, the rib-like supporting portions 6 are arranged in pairs at opposite sides of lines extending through the said apertures 8.

The guard flanges 3 constitute an important feature of my improvement inasmuch as they are adapted to preclude the possibility of tires skidding or slipping off the protector while an automobile is traversing the protector.

For the sake of increased strength the intermediate portion is corrugated at its underside as indicated by 7˟, the lower projections being arranged in coincidence with the depressions between the upper projections.

Openings 3˟ are formed in the flanges 3 to afford convenient hand holds.

It will be appreciated from the foregoing that my novel protector is simple and inexpensive in construction, is susceptible of being readily placed in position and removed from working position, and is highly efficient in protecting lines of fire hose when automobiles and other vehicles across the lines of hose.

I have explicitly described the preferred embodiment of my invention in order to impart an exact understanding of said embodiment.

I do not desire, however, to be understood as limiting myself to the precise construction illustrated, my invention being defined by my appended claims within the scope of which modifications may be made without departure from my invention.

Having thus described the invention, what I claim as new is:—

1. A fire hose protector formed in one piece of appropiate material and consisting essentially of an intermediate concavo-convex portion, the upper surface of which is ribbed, upstanding flanges at the ends of said intermediate portions, and pendent supporting portions, said pendent supporting portions adapted to bear solidly against a roadway and including a central rib, end flanges with hose passage apertures at opposite sides of said rib, flat portions below the side edges of the intermediate portion, and ribs disposed between the end flanges and at opposite sides of lines extending through the said apertures.

2. A fire hose protector formed in one piece of appropiate material and consisting essentially of an intermediate concavo-convex portion, the upper surface of which is ribbed, upstanding flanges at the ends of said intermediate portions, and pendent supporting portions, said pendent supporting portions adapted to bear solidly against a roadway and including a central rib, end flanges with hose passage apertures at opposite sides of said rib, flat portions below the side edges of the intermediate portion, and ribs disposed between the end flanges and at opposite sides of lines extending through the said apertures; the intermediate concavo-convex portion being also corrugated at its lower side with the projections in coincidence with the spaces between the upper projections, and the upstanding flanges being apertured to afford hand holds.

In testimony whereof I affix my signature.

MAURICE SHOMAN.